(12) United States Patent
Nakagawa et al.

(10) Patent No.: US 10,508,685 B2
(45) Date of Patent: Dec. 17, 2019

(54) SLIDING BEARING AND BEARING MECHANISM HAVING THE SAME

(71) Applicant: OILES CORPORATION, Tokyo (JP)

(72) Inventors: Noboru Nakagawa, Fujisawa (JP); Kazuhiko Akeda, Fujisawa (JP)

(73) Assignee: OILES CORPORATION, Tokyo (JP)

(*) Notice: Subject to any disclaimer, the term of this patent is extended or adjusted under 35 U.S.C. 154(b) by 0 days.

(21) Appl. No.: 15/571,341

(22) PCT Filed: Mar. 30, 2016

(86) PCT No.: PCT/JP2016/001852
§ 371 (c)(1),
(2) Date: Nov. 2, 2017

(87) PCT Pub. No.: WO2016/185655
PCT Pub. Date: Nov. 24, 2016

(65) Prior Publication Data
US 2018/0283448 A1 Oct. 4, 2018

(30) Foreign Application Priority Data
May 20, 2015 (JP) ................... 2015-103261

(51) Int. Cl.
F16C 29/02 (2006.01)
B62D 1/16 (2006.01)
(Continued)

(52) U.S. Cl.
CPC ............... F16C 29/02 (2013.01); B62D 1/16 (2013.01); F16C 27/02 (2013.01); F16C 29/002 (2013.01);
(Continued)

(58) Field of Classification Search
CPC ...... F16C 27/063; F16C 29/002; F16C 29/02; F16C 33/20; F16C 33/201; F16H 2055/281
See application file for complete search history.

(56) References Cited

U.S. PATENT DOCUMENTS 6,113,275 A 9/2000 Blase
8,696,207 B2* 4/2014 Tange ................ B62D 3/12
384/215
(Continued)

FOREIGN PATENT DOCUMENTS

CN 1216599 A 5/1999
CN 1493795 A 5/2004
(Continued)

OTHER PUBLICATIONS

Extended European Search Report dated Nov. 28, 2018 in European Application No. 16796052.5 (7 pages).
(Continued)

Primary Examiner — James Pilkington
(74) Attorney, Agent, or Firm — Nixon & Vanderhye P.C.

(57) ABSTRACT

A sliding bearing 1 which is interposed between a tube 4 and a rack shaft 7 includes a bearing body 11 and two elastic rings 13 and 14 fitted on an outer surface 12 of the bearing body 11, and the bearing body 11 has slits 26 extending from an end face 22 to this side of an end face 24, slits 27 extending from the end face 24 to this side of the end face 22, an inner surface 33 having a sliding surface 28, and an outer surface 12 on which are formed grooves 34 respectively receiving the elastic rings 13 and 14 and projections 35 and 36 respectively provided on axial end portions 23 and 25 with the grooves 34 disposed therebetween.

7 Claims, 5 Drawing Sheets

(51) Int. Cl.
- *F16C 33/20* (2006.01)
- *F16C 27/02* (2006.01)
- *F16C 29/00* (2006.01)
- *F16H 55/28* (2006.01)
- *F16H 55/00* (2006.01)

(52) U.S. Cl.
 CPC ............ *F16C 33/201* (2013.01); *F16H 55/00* (2013.01); *F16H 2055/281* (2013.01)

(56) References Cited

U.S. PATENT DOCUMENTS

| | | | |
|---|---|---|---|
| 8,944,689 B2 * | 2/2015 | Tange | B62D 3/12 384/215 |
| 9,279,450 B2 * | 3/2016 | Zaike | F16C 27/063 |
| 2002/0085778 A1 | 7/2002 | Mena | |
| 2004/0076353 A1 | 4/2004 | Kubota et al. | |
| 2009/0000853 A1 | 1/2009 | Hirose et al. | |

FOREIGN PATENT DOCUMENTS

| | | |
|---|---|---|
| CN | 101410638 A | 4/2009 |
| FR | 2 674 918 | 10/1992 |
| GB | 1 521 920 | 8/1978 |
| JP | 56-39747 | 9/1981 |
| JP | 11-201154 | 7/1999 |
| JP | 2003-322165 A | 11/2003 |
| JP | 2004-347105 A | 12/2004 |
| JP | 2007-187285 A | 7/2007 |
| JP | 2008-74218 | 4/2008 |
| JP | 2008-215576 A | 9/2008 |

OTHER PUBLICATIONS

International Search Report for PCT/JP2016/001852, dated Jun. 28, 201, 4 pages.

Chinese Office Action mailed Dec. 20, 2018 in Chinese Application No. 201680028640.0, with English Summarized Translation, 10 pages.

European Examination Report dated Oct. 15, 2019 in European Application No. 16 796 052.5, 5 pages.

* cited by examiner

SLIDING BEARING AND BEARING MECHANISM HAVING THE SAME

This application is the U.S. national phase of International Application No. PCT/JP2016/001852 filed 30 Mar. 2016, which designated the U.S. and claims priority to JP Patent Application No. 2015-103261 filed 20 May 2015, the entire contents of each of which are hereby incorporated by reference.

TECHNICAL FIELD

The present invention relates to a sliding bearing which is interposed between, for example, a rack shaft and a tubular member accommodating the rack shaft so as to linearly movably support the rack shaft of a rack-and-pinion type steering apparatus of an automobile, and the bearing mechanism having the same.

BACKGROUND ART

A sliding bearing formed of a synthetic resin is used as a bearing for linearly movably supporting a rack shaft of a rack-and-pinion type steering apparatus of an automobile with the respect to the tubular member.

PRIOR ART DOCUMENTS

Patent Documents

Patent Document 1: JP-A-11-201154
Patent Document 2: JP-UM-B-56-39747

SUMMARY OF THE INVENTION

Problems that the Invention is to Solve

The sliding bearing has advantages in that, as compared with a rolling bearing, the sliding bearing is low in cost and excels in the vibration absorbing characteristic. However, in a case where such a sliding bearing is interposed between the rack shaft and the tubular member with an interference of an elastic ring such as an O-ring so as to linearly movably support the rack shaft with respect to the tubular member, the elastic ring can be elastically deformed by a large amount owing to the swinging motion of the rack shaft with respect to the tubular member during traveling or the like, thereby possibly causing abnormal noise, or so-called rattling noise, which provide uncomfortable feeling, due to the collision against an inner peripheral surface of the tubular member of an outer surface of the bearing body of the sliding bearing with the elastic ring fitted thereon.

The above-described problem does occurs not only in the sliding bearing shaft interposed between the rack shaft and the tubular member, but can similarly occur in, for example, a sliding bearing which is interposed between a steering column shaft (hereinafter referred to as the column shaft) and a steering column tube (hereinafter referred to as the column tube).

The present invention has been devised in view of the above-described aspects, and its object is to provide a sliding bearing which makes it possible to obviate the collusion against a tube such as a column tube, a tubular member, or the like and to eliminate the possibility of occurrence of abnormal noise (rattling noise) ascribable to the collision, as well as a bearing mechanism having such a bearing.

Means for Solving the Problems

A sliding bearing in accordance with the present invention comprises: a bearing body; and an elastic ring fitted on the bearing body, the bearing body having one slit extending from one axial end face thereof to this side of an another axial end face thereof, another slit extending from the other end face to this side of the one end face, an inner surface having a sliding surface, and an outer surface on which at least one groove receiving the elastic ring and at least one projection are respectively formed, the sliding bearing being interposed between a tube and a shaft such that the bearing body is disposed in a hollow portion defined by an inner peripheral surface of the tube with an outer peripheral surface of the elastic ring brought into contact with the inner peripheral surface of the tube with an interference, and such that the bearing body is fitted on an outer peripheral surface of the shaft relatively slidingly movably in such a manner as to tighten the shaft by the sliding surface with the resiliency of the elastic ring, wherein when the sliding bearing is interposed between the tube and the shaft, the projection being adapted to be brought into contact with the inner peripheral surface of the tube.

According to the sliding bearing in accordance with the present invention, when the sliding bearing is interposed between the tube and the shaft, the at least one projection is adapted to be brought into contact with the inner peripheral surface of the tube, so that when the sliding bearing is interposed between the tube and the shaft, it is possible to obviate the collusion between the inner peripheral surface of the tube and the outer surface of the bearing body and to eliminate the possibility of occurrence of abnormal noise (rattling noise) ascribable to the collision.

In the present invention, the at least one projection preferably has a semicircular shape, but is not limited to the same and may have, for example, a cross-sectionally semielliptical shape, a rectangular shape, or the like. It should be noted that the diameter of the outer peripheral surface of the projection is sufficient if it is identical to the diameter of the inner peripheral surface of the tube, preferably greater than the inner peripheral surface of the tube.

In the present invention, the shaft may be a rack shaft, and the tube may be a tubular member; alternatively, however, the shaft may be a column shaft, and the tube may be a column tube, or may still alternatively be other types of shaft and tube.

The elastic ring may be a so-called O-ring having a circular cross section, but may be a ring of other shapes, such as an X-shaped cross section, a U-shaped cross section, a rectangular cross section, and a trapezoidal cross section. The elastic material for forming the elastic ring may be any one of natural rubber, synthetic rubber, and an elastic thermoplastic synthetic resin, e.g., a polyester elastomer.

As the elastic ring for imparting the interference, it is possible to cite as a preferred embodiment an elastic ring whose outside diameter is approximately 0.3 mm to 1.0 mm greater than the diameter of the inner peripheral surface of the tube and whose inside diameter is approximately 0.3 mm to 1.0 mm smaller than the diameter of the bottom surface of the groove before the elastic ring is fitted on the bearing body, although the size of the elastic ring depends on its modulus of elasticity. In brief, it suffices if the elastic ring has an interference with the inner peripheral surface of the tube, projects from the outer peripheral surface of the bearing body, and is adapted to reduce the diameter of the bearing body to such an extent as to set the clearance between the sliding surface and the shaft to zero by tightening the shaft with appropriate resiliency through the sliding surface. Specifically, it suffices at least if, before the elastic ring is fitted on the bearing body, the outside diameter of the elastic ring is greater than the diameter of the inner peripheral surface of the tube, and the inside diameter of the elastic ring is smaller than the diameter of the bottom surface of the groove.

In the present invention, the one slit which is open at the inner surface and the outer surface of the bearing body in the radial direction is also open at the one end face of the bearing body in the axial direction, while the other slit which is open at the inner surface and the outer surface of the bearing body in the radial direction is also open at the other end face of the bearing body in the axial direction. Such one and other slits capable of reducing the diameter of the bearing body are preferably provided in plural numbers, and the pluralities of the one and the other slits are arranged axisymmetrically so as to obtain a uniformly reduced diameter.

In the present invention, in a preferred embodiment, the sliding surface is constituted by a plurality of sliding surface portions arranged in a direction about an axis with each of the one and the other slits interposed between adjacent ones thereof in the direction about the axis. In a preferred embodiment, each of the sliding surface portions is a concave surface having a curvature identical to a curvature of the outer peripheral surface of the shaft, but may be any other flat surface or a circular arc-shaped convex surface.

In the present invention, in a preferred embodiment, the inner surface of the bearing body further has an enlarged-diameter inner surface larger in diameter than that of the sliding surface, and the projection is formed on the outer surface of the bearing body at a position corresponding to the enlarged-diameter inner surface in a radial direction.

If the projection is formed on the outer surface of the bearing body at a position corresponding to the enlarged-diameter inner surface in a radial direction, the reaction force from the tube due to excessive contact of the projection with the inner peripheral surface of the tube can be absorbed by the flexural deformation of the bearing body at the enlarged-diameter inner surface thereof, and contact of the enlarged-diameter inner surface with the outer peripheral surface of the shaft can be avoided, thereby making it possible to ensure the movability of the shaft with respect to the bearing body.

In the present invention, the groove is preferably constituted by a plurality of, more preferably two, grooves which are spaced apart from each other in an axial direction, and in the case where the groove is constituted by a plurality of grooves, the elastic ring is preferably received in each of at least two grooves.

In the sliding bearing in accordance with the present invention, the bearing body including the sliding surface and the projection is preferably integrally molded from a synthetic resin.

As the synthetic resin for forming the bearing body, it is possible to cite as a preferred embodiment a thermoplastic synthetic resin such as polyacetal resin, polyamide resin, polyethylene resin, tetrafluoroethylene resin, or the like.

In the present invention, movable fitting may be any one of rotatable fitting, linearly movable fitting, or rotatable and linearly movable fitting concerning the shaft.

A bearing mechanism in accordance with the present invention comprises: a tube; a shaft insertingly fitted in the tube; and the sliding bearing according to any one of the above-described forms which is interposed between the tube and the shaft, wherein the elastic ring at the outer peripheral surface thereof is fitted on the inner peripheral surface of the tube with an interference, and the bearing body is disposed in the hollow portion defined by the inner peripheral surface of the tube with a clearance between the outer surface thereof and the inner peripheral surface of the tube and is fitted on the outer peripheral surface of the shaft in such a manner as to tighten the shaft with the resiliency of the elastic ring through the sliding surface, the projection being in contact with the inner peripheral surface of the tube.

According to the bearing mechanism in accordance with the present invention, since the above-described sliding bearing is provided, it is possible to eliminate noise of collusion with the tube and to allow the steering operation and the like to be effected smoothly.

Advantages of the Invention

According to the present invention, it is possible to provide a sliding bearing which makes it possible to obviate the collusion against a tube such as a column tube, a tubular member, or the like and to eliminate the possibility of occurrence of abnormal noise (rattling noise) ascribable to the collision, as well as a bearing mechanism having such a bearing.

MODE FOR CARRYING OUT THE INVENTION

Figure 1:
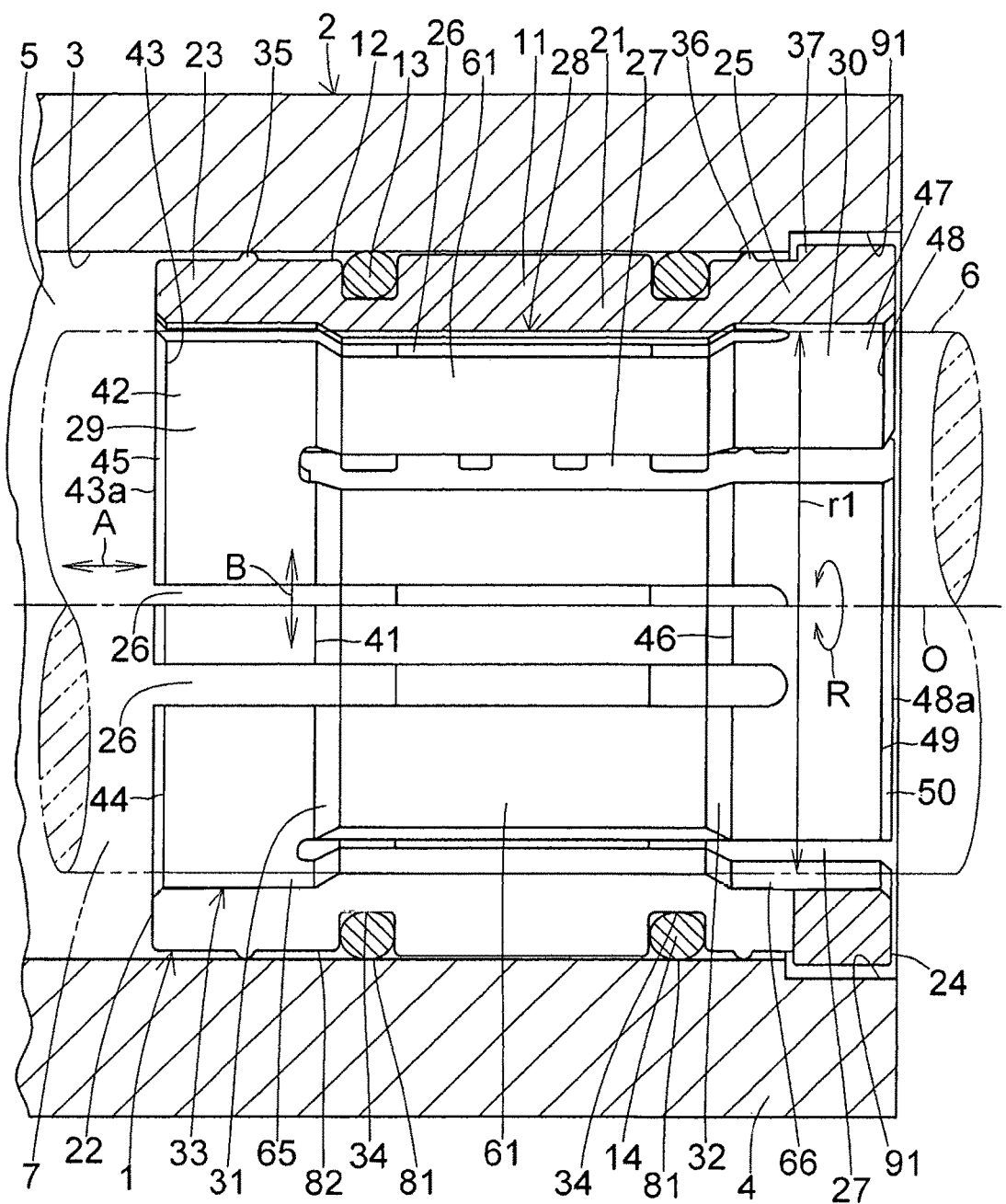
FIG. 1 is an explanatory cross-sectional view, taken in the direction of arrows along line I-I shown in FIG. 2, of a sliding bearing in accordance with a preferred embodiment of the invention.
Figure 2:
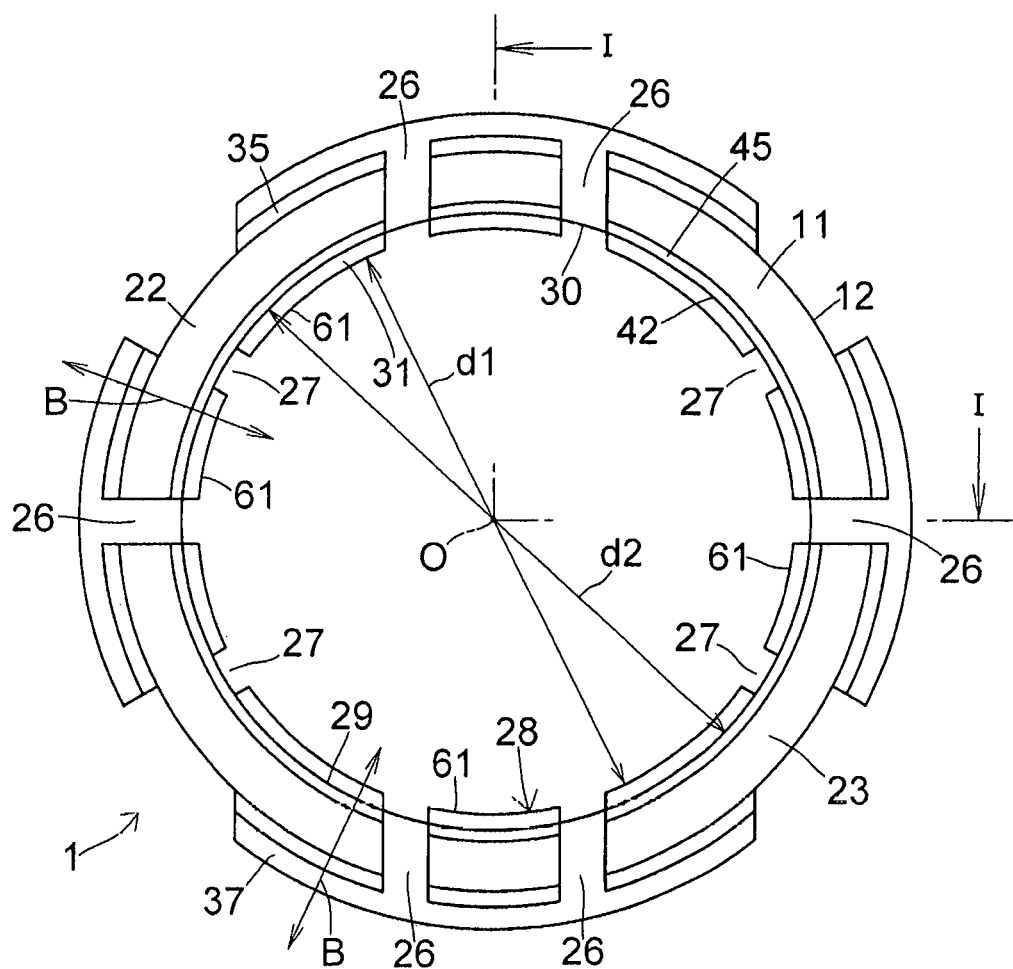
FIG. 2 is an explanatory left side view of the sliding bearing with the elastic rings omitted in the embodiment shown in FIG. 1.
Figure 3:
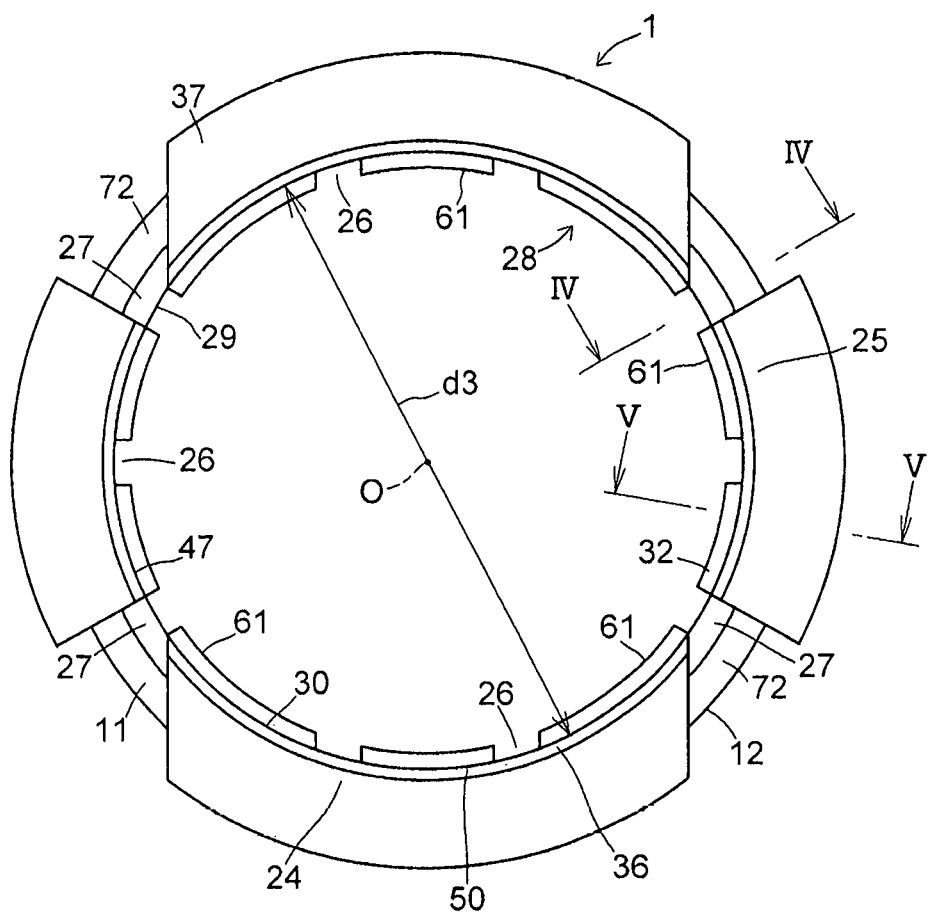
FIG. 3 is an explanatory right side view of the sliding bearing with the elastic rings omitted in the embodiment shown in FIG. 1.
Figure 4:
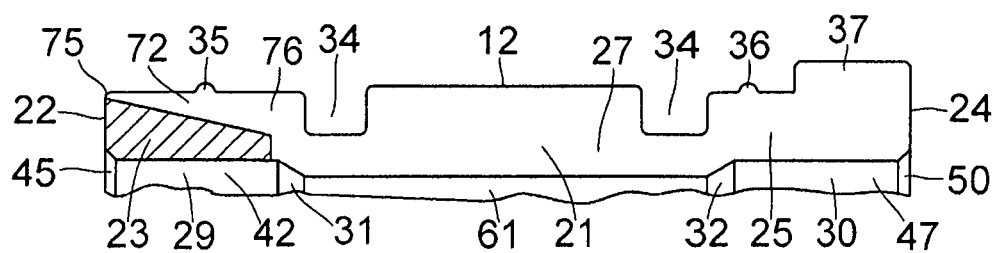
FIG. 4 is an explanatory cross-sectional view, taken in the direction of arrows along line IV-IV shown in FIG. 3, of the sliding bearing with the elastic rings omitted in the embodiment shown in FIG. 1.
Figure 5:
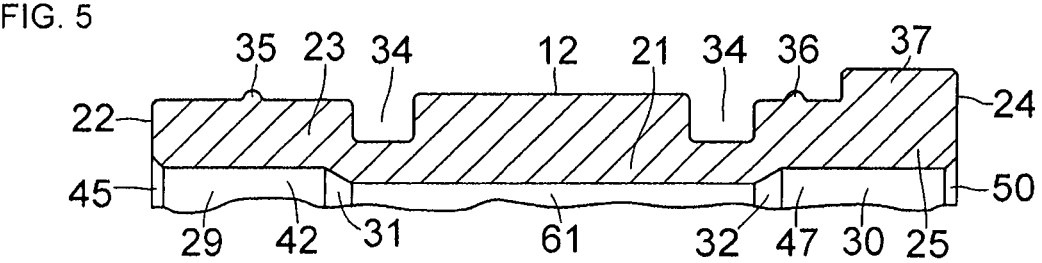
FIG. 5 is an explanatory cross-sectional view, taken in the direction of arrows along line V-V shown in FIG. 3, of the sliding bearing with the elastic rings omitted in the embodiment shown in FIG. 1.
Figure 6:
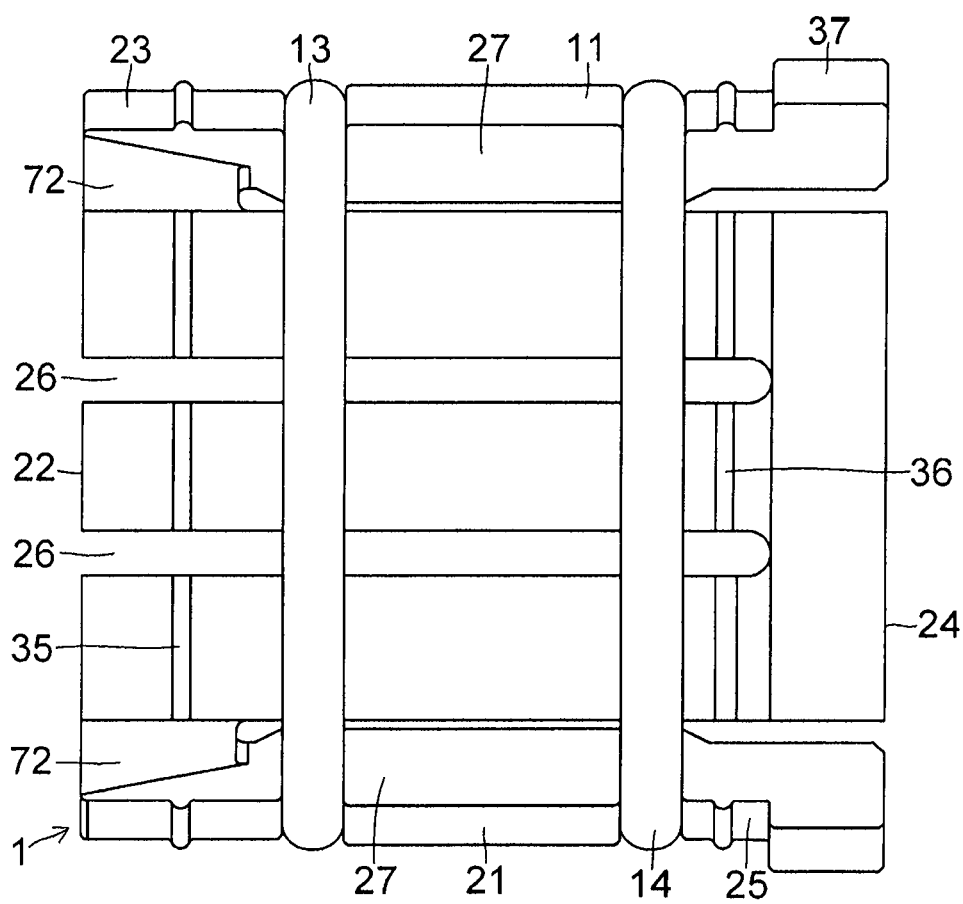
FIG. 6 is an explanatory plan view of the sliding bearing in the embodiment shown in FIG. 1.

Hereafter, a description will be given of the present invention and a mode for carrying it out on the basis of preferred embodiments shown in the drawings. It should be noted that the present invention is not limited to the embodiments.

In FIGS. 1 to 6, a bearing mechanism 2 having a sliding bearing 1 for a rack shaft of a rack-and-pinion type steering apparatus serving as a sliding bearing includes a cylindrical tubular member (hereafter referred to as the tube) 4 serving as a tube having a cylindrical inner peripheral surface 3; and a cylindrical rack shaft 7 which is insertingly secured in the tube, i.e., a cylindrical hollow portion 5 defined by the inner peripheral surface 3, and which serves as a shaft having a cylindrical outer peripheral surface 6. The sliding bearing 1 is interposed between the tube 4 and the rack shaft 7.

The sliding bearing 1 includes a bearing body 11 and two elastic rings 13 and 14 fitted on an outer surface 12 of the bearing body 11.

The bearing body 11 includes a cylindrical central portion 21 in an axial direction A; one cylindrical axial end portion 23 between one annular end face 22 in the axial direction A and the central portion 21; another cylindrical axial end portion 25 between another annular end face 24 in the axial direction A and the central portion 21; a plurality of (six) slits 26 on one side which respectively extend in the axial direction A from the end face 22 to this side of the end face 24 and are arranged in a direction R about an axis O; a plurality of (four) slits 27 on another side which respectively extend in the axial direction A from the end face 24 to this side of the end face 22 and are arranged in the direction R; a cylindrical inner surface 33 having a cylindrical sliding surface 28 provided on the central portion 21, a cylindrical enlarged-diameter inner surface 29 provided on the axial end portion 23 between the end face 22 and the sliding surface 28 in the axial direction A, a cylindrical enlarged-diameter inner surface 30 provided on the axial end portion 25 between the end face 24 and the sliding surface 28 in the axial direction A, a cylindrical inclined inner surface 31 between the enlarged-diameter inner surface 29 and the sliding surface 28 in the axial direction A, and a cylindrical inclined inner surface 32 between the enlarged-diameter inner surface 30 and the sliding surface 28 in the axial direction A; and the cylindrical outer surface 12 having formed thereon two annular grooves 34 which are provided on the central portion 21 in such a manner as to be spaced apart from each other in the axial direction A and which respectively receive the elastic rings 13 and 14, one and another annular projection 35 and 36 respectively provided on the axial end portions 23 and 25 with the two grooves 34 disposed therebetween in the axial direction A, and a retaining annular collar 37.

The enlarged-diameter inner surface 29 has a cylindrical surface 42 which is continuously connected at one end 41 thereof in the axial direction A to one end in the axial direction A of the inclined inner surface 31 and which extends in the axial direction A in parallel to the sliding surface 28, as well as a tapered surface 45 which is continuously connected at one end 43 thereof in the axial direction A to another end 44 in the axial direction A of the surface 42 and is continuously connected at another end 43a thereof in the axial direction A to an annular inside diameter edge of the end face 22, and which is gradually enlarged in diameter from that one end 43 toward that other end 43a. The enlarged-diameter inner surface 30 has a cylindrical surface 47 which is continuously connected at one end 46 thereof in the axial direction A to one end in the axial direction A of the inclined inner surface 32 and which has an identical diameter to that of the surface 42 and extends in the axial direction A in parallel to the sliding surface 28, as well as a tapered surface 50 which is continuously connected at one end 48 thereof in the axial direction A to another end 49 in the axial direction A of the surface 47 and is continuously connected at another end 48a thereof in the axial direction A to an annular inside diameter edge of the end face 24, and which is gradually enlarged in diameter from that one end 48 toward that other end 48a.

The cylindrical central portion 21, the cylindrical sliding surface 28, the cylindrical inclined inner surface 31, the cylindrical inclined inner surface 32, the two annular grooves 34, and the annular projections 35 and 36 are respectively separated in the direction R by the slits 26 and 27. The annular end face 22, the cylindrical axial end portion 23, and the cylindrical enlarged-diameter inner surface 29 having the surface 42 and the tapered surface 45 are respectively separated in the direction R by the slits 26. The annular end face 24, the cylindrical axial end portion 25, the enlarged-diameter inner surface 30 having the surface 47 and the tapered surface 50, and the collar 37 are respectively separated in the direction R by the slits 27.

The bearing body 11, which includes the central portion 21, the axial end portion 23, the axial end portion 25, the projections 35 and 36, and the collar 37, is integrally molded from a synthetic resin. The sliding surface 28, which is provided at a position corresponding in a radial direction B to a position between the projections 35 and 36 in the axial direction A in the inner surface 33, is constituted by a plurality of (ten) sliding surface portions 61 arranged in the direction R with each of the slits 26 and 27 interposed between adjacent ones thereof in the direction R. Each sliding surface portion 61 is constituted by a circular arc-shaped concave surface having an identical curvature to the curvature of the outer peripheral surface 6 having a radius r1, and respective distances (radii) d1 between the sliding surface portions 61 opposing each other in the radial direction B are equal to each other and are smaller than respective distances (radii) d2 between the surfaces 42 opposing each other in the radial direction B and respective distances (radii) d3 between the surfaces 47 similarly opposing each other in the radial direction B. Thus, the respective enlarged-diameter inner surfaces 29 and 30 are adapted to form clearances 65 and 66 in the radial direction B with respect to the outer peripheral surface 6 with which the respective sliding surface portions 61 are brought into contact.

The bearing body 11 further has a plurality of grooves 72 which are formed in the outer surface 12 in correspondence with the respective slits 27, and each of the grooves 72 has one end 75 in the axial direction A which is open at the end face 22 and another end 76 in the axial direction A which communicates with a corresponding one of the slits 27.

Each of the elastic rings 13 and 14 is fitted at an annular outer peripheral surface 81 thereof to the inner peripheral surface 3 with an interference. Thus, the bearing body 11 is interposed between the tube 4 and the rack shaft 7 by being disposed in the hollow portion 5 with a cylindrical clearance 82 in the radial direction B between the outer surface 12 and the inner peripheral surface 3 in the radial direction B and by being fitted on the outer peripheral surface 6 relatively movably, namely, linearly movably in the axial direction A and rotatably in the direction R, in such a manner as to tighten the outer peripheral surface 6 of the rack shaft 7 by the sliding surface portions 61 with the resiliency of the elastic rings 13 and 14. The cross-sectionally semicircular projections 35 and 36 at the annular outer peripheral surfaces 81 thereof are in contact with the inner peripheral surface 3.

A plurality of fitting recesses 91 are formed on the inner peripheral surface 3 in correspondence with the plurality of collars 37, and corresponding ones of the collars 37 are fitted in the respective fitting recesses 91, thereby allowing the sliding bearing 1 be fixed to the inner peripheral surface 3.

According to the above-described bearing mechanism 2, since the sliding bearing 1 is interposed between the tube 4 and the rack shaft 7, the rack shaft 7 can be supported linearly movably in the axial direction A and rotatably in the direction R with respect to the tube 4. Moreover, since the projections 35 and 36 at the outer peripheral surfaces 81 thereof are adapted to come into contact with the inner peripheral surface 3, it is possible to obviate the collision between the tube 4 and the outer surface 12, thereby making it possible to eliminate the possibility of occurrence of abnormal noise (rattling noise) ascribable to the collision.

In addition, according to the bearing mechanism 2, since the projections 35 and 36 are provided on the axial end portions 23 and 25 to allow the enlarged-diameter inner surfaces 29 and 30 of the axial end portions 23 and 25 to respectively form the clearances 65 and 66 in the radial direction B with respect to the outer peripheral surface 6, it is possible to allow the flexural deformation in the radial direction B of the axial end portions 23 and 25. As a result, this flexural deformation makes it possible to absorb reaction force from the tube 4 due to excessive contact of the projections 35 and 36 with the inner peripheral surface 3 of the tube 4, and the clearances 65 and 66 make it possible to avoid the contact of the enlarged-diameter inner surfaces 29 and 30 with the outer peripheral surface 6 of the rack shaft 7. Meanwhile, it is possible to ensure the tightening of the outer peripheral surface 6 by the sliding surface portions 61 by virtue of the resiliency of the elastic rings 13 and 14. Hence, it is possible to effect linearly movable support in the axial direction A and rotatable support in the direction R of the rack shaft 7 with respect to the tube 4.

Figure 7:
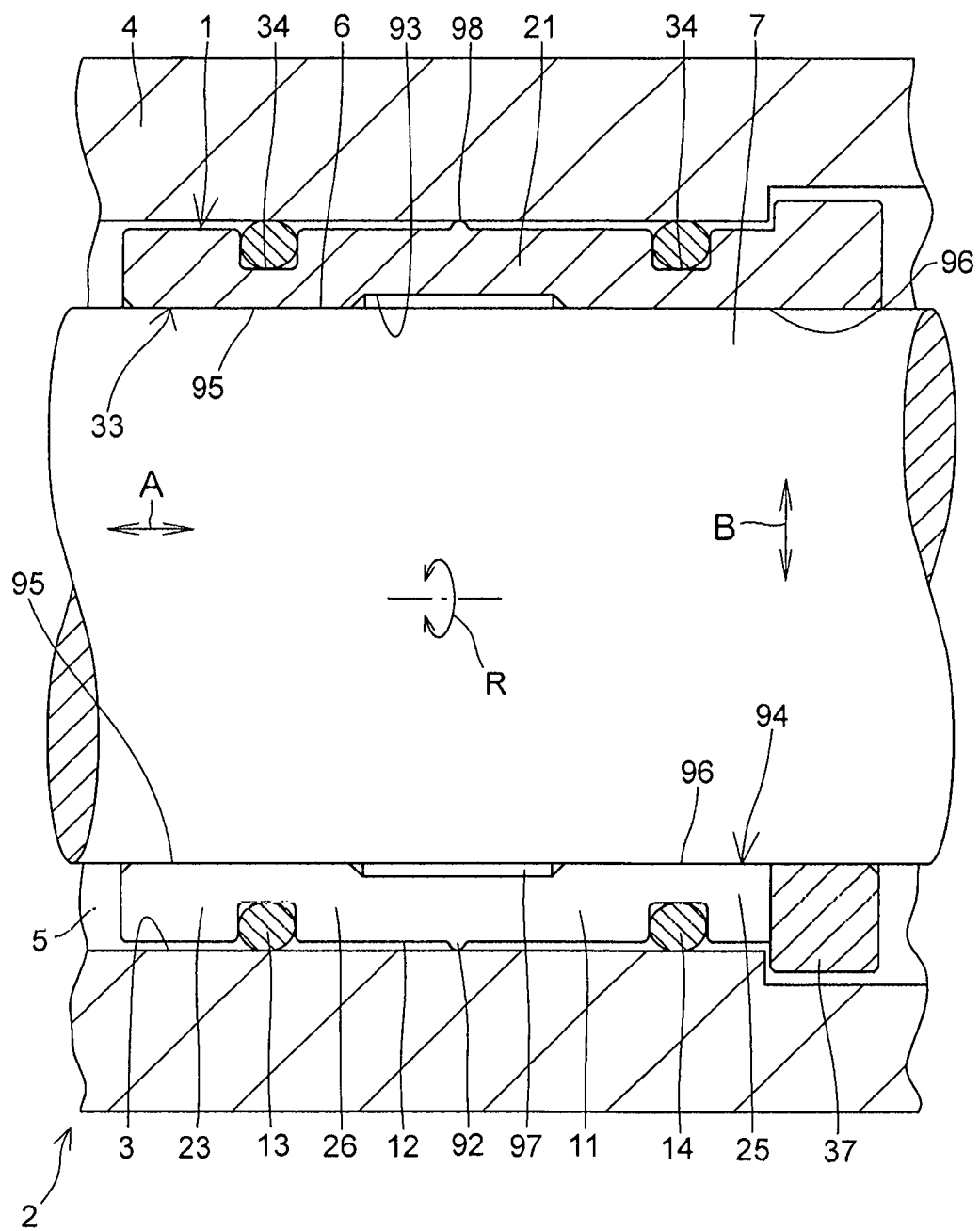
FIG. 7 is an explanatory cross-sectional view of another preferred embodiment of the present invention.

The bearing body 11 shown in FIGS. 1 to 6 is provided with the two projections 35 and 36 which are formed on the outer surface 12 at positions respectively corresponding to the enlarged-diameter inner surfaces 29 and 30 in the radial direction B. However, as shown in FIG. 7, in the sliding bearing 1 including the bearing body 11 and the two elastic rings 13 and 14 fitted on the outer surface 12 of the bearing body 11, the bearing body 11 may have one projection 92 formed on the outer surface 12 of the central portion 21 between the grooves 34 in the axial direction A. In the case of the bearing body 11 shown in FIG. 7, the inner surface 33 has a cylindrical enlarged-diameter inner surface 93 provided on the central portion 21 and a cylindrical sliding surface 94 provided on the central portion 21 excluding the portion of the enlarged-diameter inner surface 93 and on the axial end portions 23 and 25. The one groove 34 is formed on the outer surface 12 of the axial end portion 23, and the other groove 34 is formed on the outer surface 12 of the axial end portion 25. The projection 92 and the enlarged-diameter inner surface 93 are separated in the direction R by the slits 26 and 27, the sliding surface 94 at the axial end portion 23 is separated by the slits 26, and the sliding surface 94 at the axial end portion 25 is separated by the slits 27. Thus, in the same way as the sliding surface 28, the sliding surface 94 at the axial end portion 23 is constituted by a plurality of (ten) sliding surface portions 95 arranged in the direction R with each of the slits 26 interposed between adjacent ones thereof in the direction R, while the sliding surface 94 at the axial end portion 25 is constituted by a plurality of (ten) sliding surface portions 96 arranged in the direction R with each of the slits 27 interposed between adjacent ones thereof in the direction R. The sliding surface portions 95 and 96 are formed in the same way as the sliding surface portions 61. The enlarged-diameter inner surface 93, which separates the sliding surface 94 in the axial direction A into the sliding surface portions 95 and 96, is adapted to form a clearance 97 in the radial direction B with respect to the outer peripheral surface 6 with which the respective sliding surface portions 95 and 96 are brought into contact.

Also in the bearing mechanism 2 shown in FIG. 7, since the sliding bearing 1 is interposed between the tube 4 and the rack shaft 7, the rack shaft 7 can be supported linearly movably in the axial direction A and rotatably in the direction R with respect to the tube 4. Moreover, since the projection 92, which is formed on the outer surface 12 of the central portion 21 at a position corresponding to the enlarged-diameter inner surface 93 in the radial direction B, at an outer peripheral surface 98 thereof is adapted to come into contact with the inner peripheral surface 3, it is possible to obviate the collision between the tube 4 and the outer surface 12, thereby making it possible to eliminate the possibility of occurrence of abnormal noise (rattling noise) ascribable to the collision. Moreover, since the enlarged-diameter inner surface 93 is adapted to form the clearance 97, it is possible to allow the flexural deformation of the central portion 21 in the radial direction B. In consequence, the reaction force from the tube 4 due to excessive contact of the projection 92 with the inner peripheral surface 3 of the tube 4 can be absorbed by the flexural deformation of the central portion 21 at the enlarged-diameter inner surface 93, and it is possible to avoid the contact of the enlarged-diameter inner surface 93 with the outer peripheral surface 6 of the rack shaft 7. Hence, it is possible to ensure linearly movable support in the axial direction A and rotatable support in the direction R of the rack shaft 7 with respect to the tube 4, i.e., the movability of the rack shaft 7 with respect to the bearing body 11.

The invention claimed is:

1. A bearing mechanism comprising:
a tube;
a shaft insertingly fitted in said tube; and
a sliding bearing interposed between said tube and said shaft,
said sliding bearing comprising:
a bearing body; and
an elastic ring fitted on said bearing body,
said bearing body having one slit extending from one axial end face towards another axial end face, another slit extending from the other axial end face towards the one axial end face, an inner surface having a sliding surface, and an outer surface on which at least one groove receiving said elastic ring and first and second projections are respectively formed with the at least one groove disposed therebetween in an axial direction,
wherein said elastic ring at an outer peripheral surface thereof is fitted on an inner peripheral surface of said tube with an interference,
said bearing body is disposed in a hollow portion defined by the inner peripheral surface of said tube with a clearance between the outer surface thereof and the inner peripheral surface of said tube and is fitted on an outer peripheral surface of said shaft with the resiliency of said elastic ring, and
the first and the second projections being in contact with the inner peripheral surface of said tube.

2. The bearing mechanism according to claim 1, wherein the shaft is a steering column shaft, and the tube is a steering column tube.

3. The bearing mechanism according to claim 1, wherein the shaft is a rack shaft, and the tube is a tubular member.

4. The bearing mechanism according to claim 1, wherein the sliding surface is constituted by a plurality of sliding surface portions arranged in a direction about an axis with each of the one and the other slits interposed between adjacent ones thereof in the direction about the axis, and each of the sliding surface portions is a concave surface having a curvature identical to a curvature of the outer peripheral surface of the shaft.

5. The bearing mechanism according to claim 1, wherein the inner surface of said bearing body further has an enlarged-diameter inner surface larger in diameter than that of the sliding surface, and the first and the second projections are formed on the outer surface of said bearing body at a position corresponding to the enlarged-diameter inner surface in a radial direction.

6. The bearing mechanism according to claim 1, wherein a plurality of grooves are provided, and the plurality of grooves are spaced apart from each other in the axial direction, and wherein a plurality of elastic rings are provided, each one of the elastic rings being received in a respective one of the plurality of grooves.

7. The bearing mechanism according to claim 1, wherein said bearing body including the sliding surface and the first and the second projections are integrally molded from a synthetic resin.

* * * * *